US012663844B2

(12) United States Patent

Colenbrander et al.

(10) Patent No.: US 12,663,844 B2

(45) Date of Patent: Jun. 23, 2026

(54) SERVER/DEVICE COOLING CONTROL

(71) Applicant: Sony Interactive Entertainment Inc., Tokyo (JP)

(72) Inventors: Roderick Colenbrander, San Mateo, CA (US); Harry Rogers, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 615 days.

(21) Appl. No.: 18/054,471

(22) Filed: Nov. 10, 2022

(65) Prior Publication Data

US 2024/0160257 A1     May 16, 2024

(51) Int. Cl.
*G06F 1/20* (2006.01)

(52) U.S. Cl.
CPC ............... *G06F 1/206* (2013.01); *G06F 1/20* (2013.01); *G05B 2219/49216* (2013.01)

(58) Field of Classification Search
CPC . G06F 1/20; G06F 1/206; G05B 2219/49216; H05K 7/20727; H05K 7/20836
See application file for complete search history.

(56) References Cited

U.S. PATENT DOCUMENTS

| | | | | |
|---|---|---|---|---|
| 2010/0083018 | A1* | 4/2010 | Park | G06F 1/203 |
| | | | | 713/320 |
| 2010/0280680 | A1* | 11/2010 | Angell | G06F 1/206 |
| | | | | 700/36 |
| 2013/0340996 | A1 | 12/2013 | David et al. | |
| 2018/0059747 | A1* | 3/2018 | Pfeifer | G06F 1/3206 |
| 2018/0341301 | A1 | 11/2018 | Shabbir et al. | |
| 2019/0037734 | A1* | 1/2019 | Franz | H05K 7/20781 |
| 2019/0166727 | A1* | 5/2019 | Deev | G05B 15/02 |
| 2021/0263574 | A1* | 8/2021 | Berke | G11C 5/04 |
| 2021/0325947 | A1* | 10/2021 | Shabbir | G06F 1/206 |
| 2023/0269899 | A1* | 8/2023 | Takken | H05K 7/20136 |
| | | | | 361/678 |
| 2024/0049422 | A1* | 2/2024 | Wang | H05K 7/20136 |
| 2024/0155815 | A1* | 5/2024 | An | H05K 7/20836 |

OTHER PUBLICATIONS

"International Search Report and Written Opinion", dated Feb. 9, 2024, from the counterpart PCT application PCT/US23/077694.

* cited by examiner

*Primary Examiner* — Mong-Shune Chung

(74) *Attorney, Agent, or Firm* — Kilpatrick Townsend & Stockton LLP

(57) ABSTRACT

To minimize use of power required for cooling and get ahead of temperature buildup, a mode of operation can be established for a cooling element of a device based on one or more non-temperature factor values. For example, current values, power values, or even values related to initiating a video game may be used. The cooling element itself may be a server fan, a coolant pump, or another type of cooling element.

20 Claims, 11 Drawing Sheets

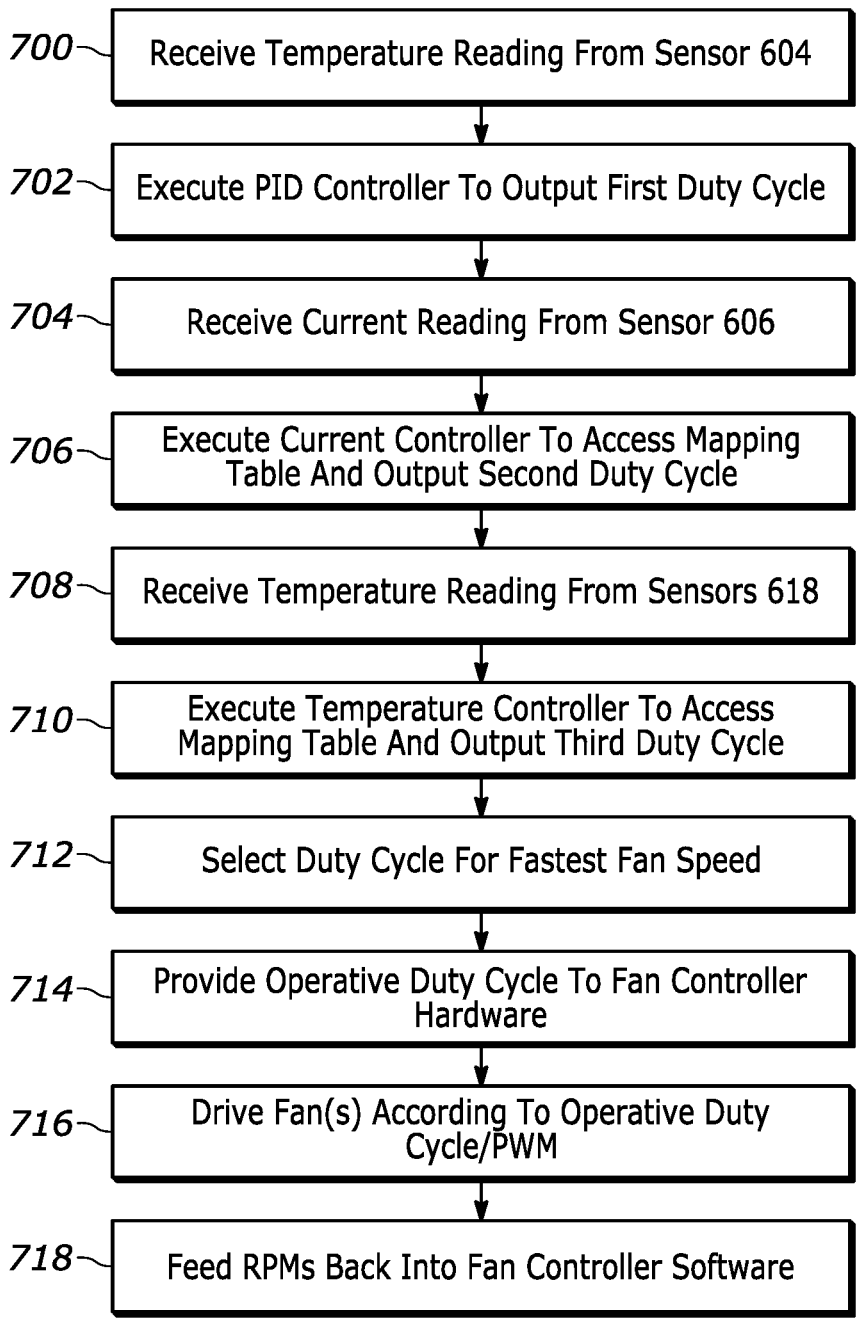

700 — Receive Temperature Reading From Sensor 604

702 — Execute PID Controller To Output First Duty Cycle

704 — Receive Current Reading From Sensor 606

706 — Execute Current Controller To Access Mapping Table And Output Second Duty Cycle 708 — Receive Temperature Reading From Sensors 618

710 — Execute Temperature Controller To Access Mapping Table And Output Third Duty Cycle 712 — Select Duty Cycle For Fastest Fan Speed 714 — Provide Operative Duty Cycle To Fan Controller Hardware 716 — Drive Fan(s) According To Operative Duty Cycle/PWM 718 — Feed RPMs Back Into Fan Controller Software

FIG. 7

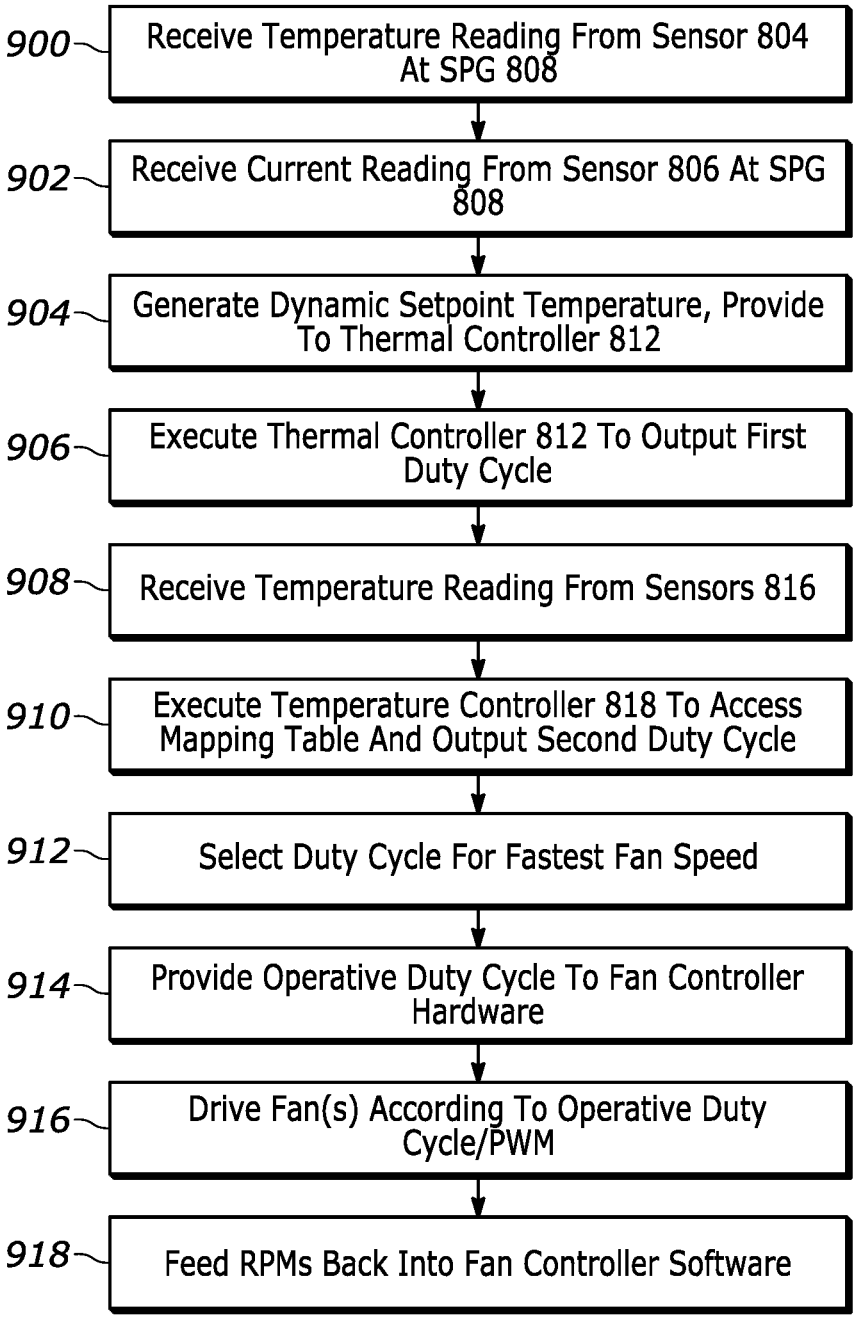

900 — Receive Temperature Reading From Sensor 804 At SPG 808

902 — Receive Current Reading From Sensor 806 At SPG 808

904 — Generate Dynamic Setpoint Temperature, Provide To Thermal Controller 812

906 — Execute Thermal Controller 812 To Output First Duty Cycle

908 — Receive Temperature Reading From Sensors 816

910 — Execute Temperature Controller 818 To Access Mapping Table And Output Second Duty Cycle 912 — Select Duty Cycle For Fastest Fan Speed 914 — Provide Operative Duty Cycle To Fan Controller Hardware 916 — Drive Fan(s) According To Operative Duty Cycle/PWM 918 — Feed RPMs Back Into Fan Controller Software

FIG. 9

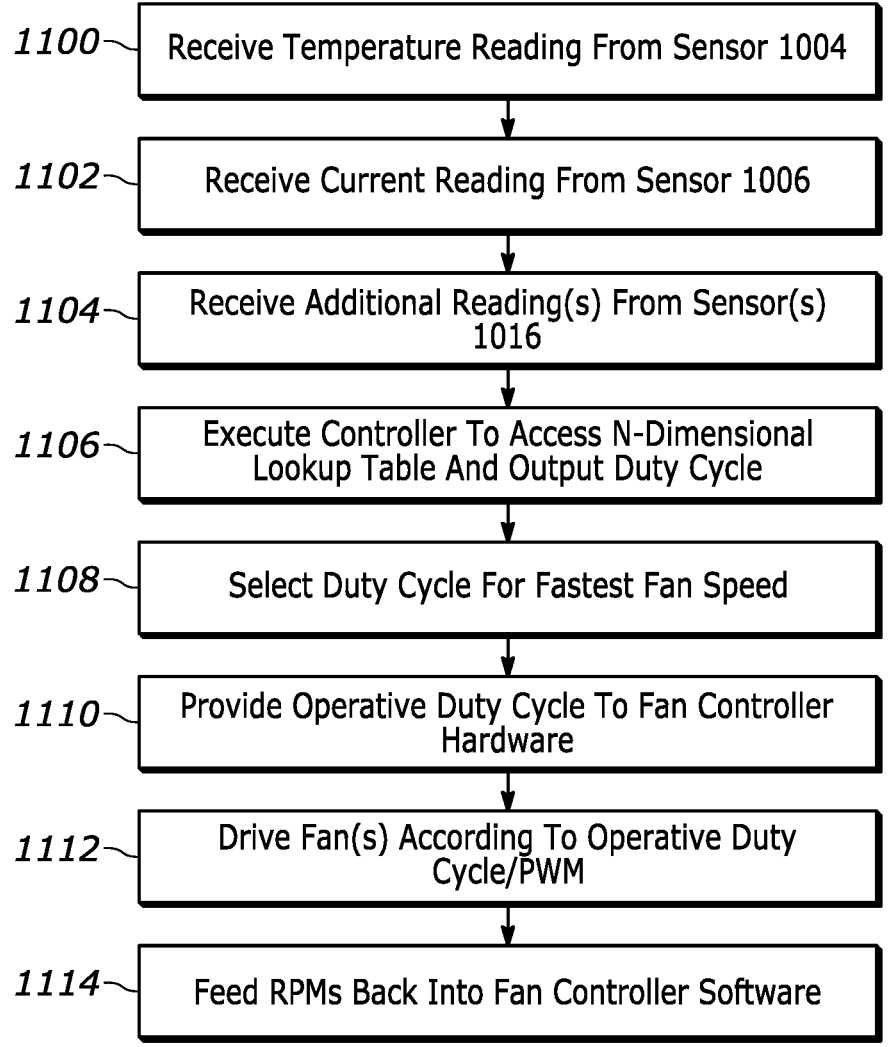

1100 — Receive Temperature Reading From Sensor 1004

1102 — Receive Current Reading From Sensor 1006

1104 — Receive Additional Reading(s) From Sensor(s) 1016

1106 — Execute Controller To Access N-Dimensional Lookup Table And Output Duty Cycle 1108 — Select Duty Cycle For Fastest Fan Speed 1110 — Provide Operative Duty Cycle To Fan Controller Hardware 1112 — Drive Fan(s) According To Operative Duty Cycle/PWM 1114 — Feed RPMs Back Into Fan Controller Software

FIG. 11

1200 — Receive Video Game Start Command Or Other Command

1202 — Access History/ML Model

1204 — Predict/Infer Power Consumption/Current Profile For Game And/Or Command

1206 — Identify Corresponding Duty Cycle

1208 — Provide Operative Duty Cycle To Fan Controller Hardware

1210 — Drive Fan(s) According To Operative Duty Cycle/PWM

1212 — Feed RPMs Back Into Fan Controller Software

SERVER/DEVICE COOLING CONTROL

FIELD

The present application relates generally to cooling control of servers and other devices.

BACKGROUND

As recognized herein, servers and other types of computing devices should be adequately cooled during operation to prevent heat generated by the device from adversely affecting performance, crashing the machine, damaging hardware, etc. As also recognized herein, this may be done by actuating one or more fans in the device's housing to begin cooling the device and then adjusting fan speed according to temperature, but since temperature buildup can lag the application of power to the system, the fans often play catchup to get system's heat under control. This in turn can lead to consuming undue amounts of power to drive the fans while also unnecessarily approaching or reaching the max temperature for the system itself. There are currently no adequate solutions to the foregoing computer-related, technological problem.

SUMMARY

As further recognized herein, blade servers can be used to stream video games from the cloud to client devices like personal computers, video game consoles, etc. The server blades should be cooled, but again, adjusting fan speed according to temperature may be insufficient given the lag in temperature buildup. Proactive temperature control using other factors that can be leading indicators or leading metrics of temperature buildup can therefore be used to prevent server blades from reaching temperatures that they otherwise would reach using the temperature factor alone, which in turn can reduce overall energy required to cool the target system by cooling the system sooner while also prolonging the life of the system's hardware and maintaining a better level of performance unaffected by heat.

Accordingly, in one aspect a method includes establishing a first speed of a fan in a server housing based at least in part on a non-temperature factor having a first value, and establishing a second speed of the fan based at least in part on the non-temperature factor having a second value.

In various example implementations, the non-temperature factor may include current, power, and/or at least one factor associated with a computer command such as a video game command. A game command or other computer command may be a signal to the system to begin a processing load in certain non-limiting examples.

Also in various example implementations, the method may include establishing the first speed at least in part based on temperature associated with a blade server. So, for example, the method may include establishing the first speed by selecting a highest speed from respective speeds respectively output by a temperature controller and a non-temperature factor controller. As another example, the method may include establishing the first fan speed at least in part by establishing a target temperature, with the target temperature varying according to the non-temperature factor. As another example, the method may include establishing the first fan speed at least in part by accessing a database structure using temperature and the non-temperature factor as entering arguments.

In another aspect, an apparatus includes at least one processor configured to establish a first mode of operation for a cooling element of a device based at least in part on a non-temperature factor having a first value, and to establish a second mode of operation for the cooling element of the device based at least in part on the non-temperature factor having a second value.

So, for example, the first mode of operation may include a first speed and the second mode of operation may include a second speed. Also in various examples, the cooling element may include a fan and/or a liquid pump. The device itself may be a server, a personal computer, a mobile device, a heating, ventilation, and air conditioning (HVAC) system, or another type of device.

Still further, in various example implementations the non-temperature factor may include current, power, and/or an amount of power expected to be used to execute a computer command.

In still another aspect, a device includes at least one computer storage that is not a transitory signal. The storage includes instructions executable by at least one processor to establish a first mode of operation for a cooling element based at least in part on a non-temperature factor having a first value and establish a second mode of operation for the cooling element based at least in part on the non-temperature factor having a second value.

In various example embodiments, the first mode of operation may include a first speed and the second mode of operation may include a second speed. So, for example, the cooling element may include a fan and the first and second speeds may be fan speeds. As another example, the cooling element may include a liquid pump and the first and second speeds may be pump speeds.

The details of the present application, both as to its structure and operation, can be best understood in reference to the accompanying drawings, in which like reference numerals refer to like parts, and in which:

BRIEF DESCRIPTION OF THE DRAWINGS

FIG. 7 shows example logic in example flow chart format that may be executed by a device in accordance with the example implementation of FIG. 6;

FIG. 9 shows example logic in example flow chart format that may be executed by a device in accordance with the example implementation of FIG. 8;

FIG. 11 shows example logic in example flow chart format that may be executed by a device in accordance with the example implementation of FIG. 10.

DETAILED DESCRIPTION

Figure 1:
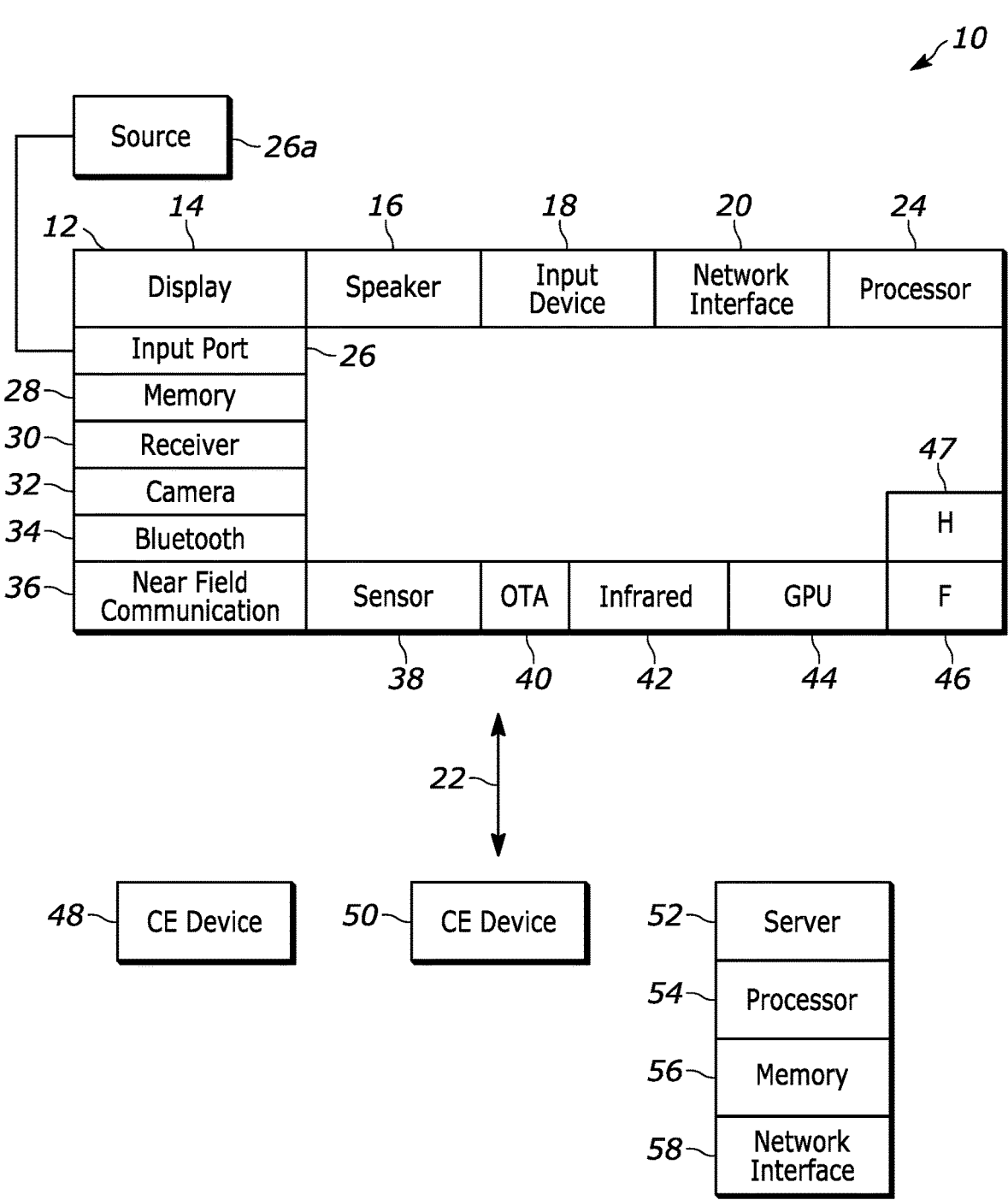
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled 5G ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be $-1$; if it is increasing, the output of the EDS may be a $+1$. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby. The server 52 may also be a blade server or rack server, for example.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
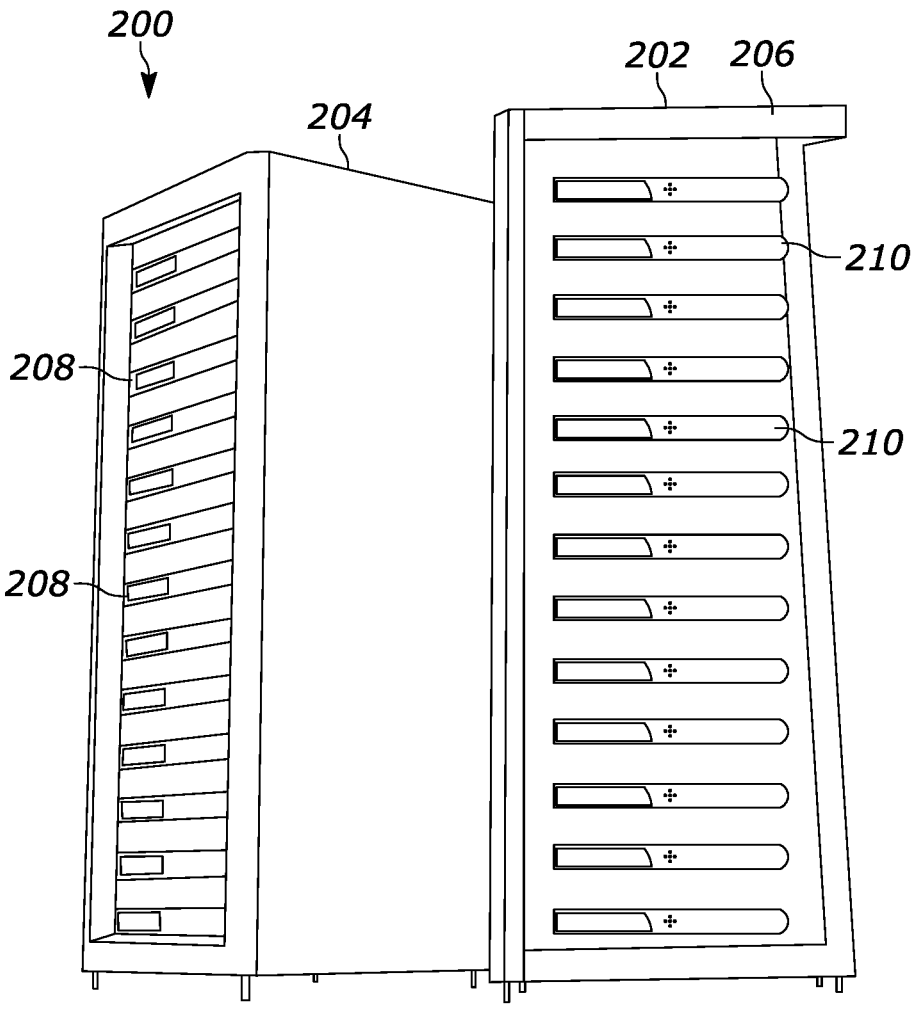
FIG. 2 shows two blade servers that may be cooled consistent with present principles.

Before getting into detail in relation to FIG. 2, note more generally consistent with present principles that fan speed and pump speed for cooling devices like those mentioned above may be established not just as a function of system temperature (e.g., 25C→30% PWM fan speed for fans of a console, PC, server, etc.) but also based on current and other non-temperature factors. Fan/pump speed may therefore be derived using various non-temperature factors according to the implementations discussed below, such as using a mapping table and/or algorithm. Accordingly, fan speed (or pump speed) may be not just a function of system temperature also current/power as might be reported by power sensors, current sensors, etc. This may help cool a system much earlier in time as the system might take quite some time to warm up (e.g., due to thermal conductance/resistance for heatsinks). Using current or power, for example, therefore allows the system to anticipate much sooner that fans/pumps should be activated, sped up, etc., thereby using lower fan/pump speeds where possible, saving on overall fan/pump power consumption, and avoiding overshoots/undershoots of fan/pump speed in at least some instances.

Now in reference to FIG. 2, example blade servers 200, 202 are shown. Each server 200, 202 may include a housing/chassis 204, 206. Among other components, one or more server blades 208, 210 may be included inside each housing 204, 206. The blades 208, 210 may be established by relatively thin, modular electronic circuit boards and other components. Each blade 208, 210 may contain a single server and may be dedicated to a single application in certain examples. Consistent with present principles, temperature within the housings 204, 206 (including temperature of the blades 208, 210) may be controlled using non-temperature factors as described further below. However, further note that present principles may be used for devices other than blade servers, including other server types (e.g., rack servers), personal computers such as desktop and laptop computers, and mobile devices such as smartphones, headsets/computerized glasses, other wearable devices, etc.

Figure 3:
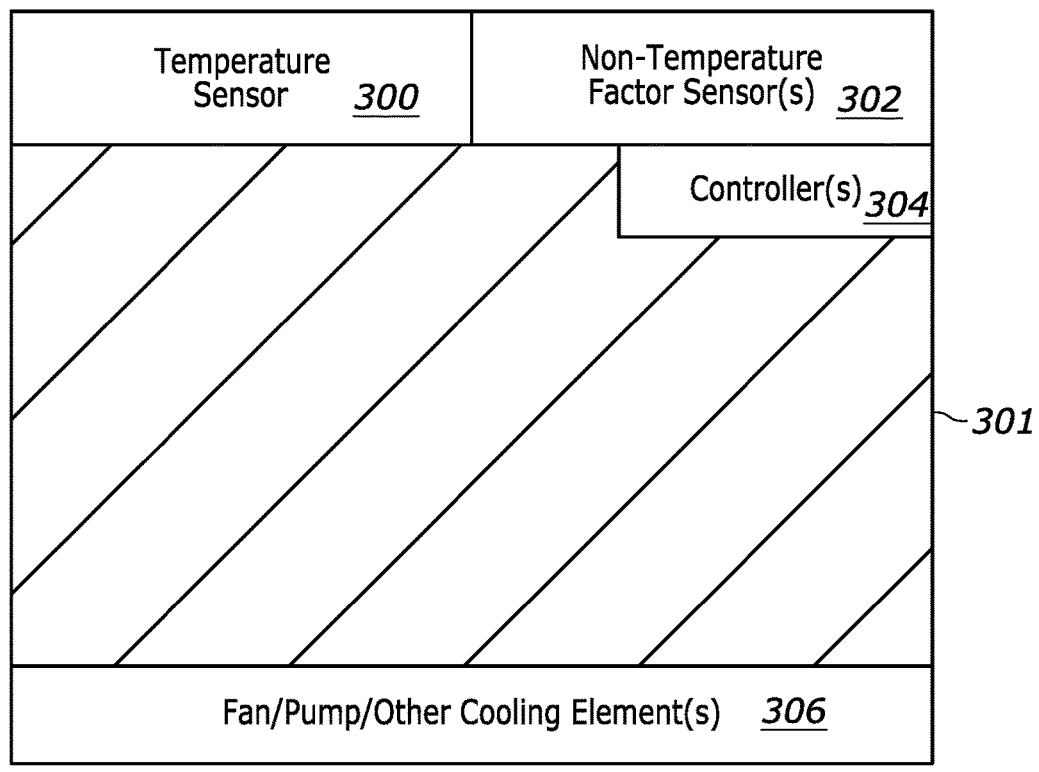
FIG. 3 shows a blade server housing with various sensors and other components that may be used consistent with present principles.

But assuming a server embodiment and with further reference to FIG. 3, a block diagram of a housing 301 for one of the blade servers 200/202 is shown. The housing 301 may therefore include, in addition to the blades 208, 210 and other system components such as a network interface and storage, one or more temperature sensors 300 as well as one or more non-temperature factor sensors 302 of one or more different types. The sensors 300, 302 may provide their outputs/data to one or more processors/controllers 304, such as a temperature controller and/or a non-temperature factor controller. The controller 304 may therefore be established by a dedicated microprocessor, a central processing unit (CPU), an application-specific integrated circuit (ASIC), or another type of processor that may execute the functions described further below.

Accordingly, note that the sensor(s) 302 may be located at any suitable place within the housing 301, such as on the controller 304, on a motherboard of the server 200/202, or even on a power source/power supply unit of the server (not shown). As an example, the sensor(s) 302 may include a current and/or power sensor, such as a Hall Effect sensor or direct measurement sensor. The temperature sensor(s) 300 may also be located at various places within the server 200/202 as well.

As also shown in FIG. 3, housing 301 for the server 200/202 may include one or more cooling elements 306 such as one or more fans to move air and other fluid through the server 200/202 to remove heat from the system. The cooling elements may also include one or more liquid pumps to move water or another coolant around a circulation path that is in thermal communication with other parts of the sever 200/202 to remove heat from the system. In some examples, a combination of fans and pumps may be used so that, for example, the pumps pump cool liquid into the system, circulate it, and then pass the liquid by fans that cool the liquid for another round of circulation.

Figure 4:
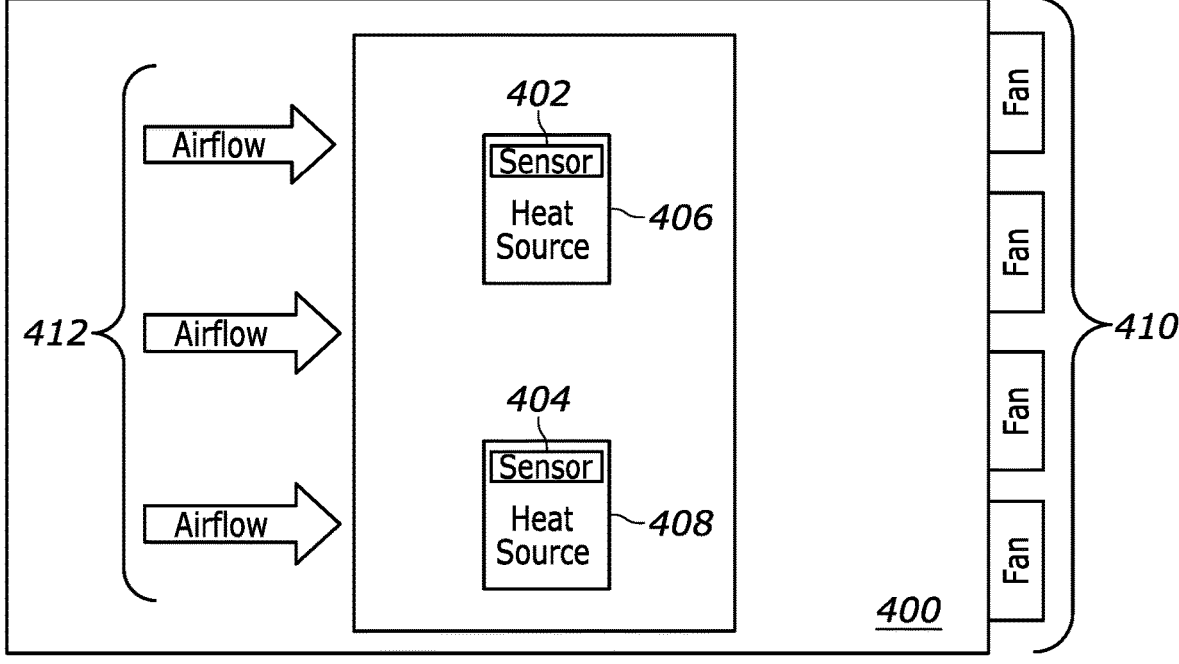
FIG. 4 shows an example schematic of a blade server being cooled consistent with present principles.

Now in reference to FIG. 4, an example schematic is shown of a blade server 400 being cooled consistent with present principles. As shown, respective sensors 402, 404 such as current or power sensors may be placed at or near a respective head source 406, 408. Then based on the data reported by the sensors 402, 404, a controller like the controller 304 may increase or decrease the speed of one or more fans 410 to respectively increase or decrease airflow 412 across the head sources 406, 408 to remove heat from them.

Figure 5:
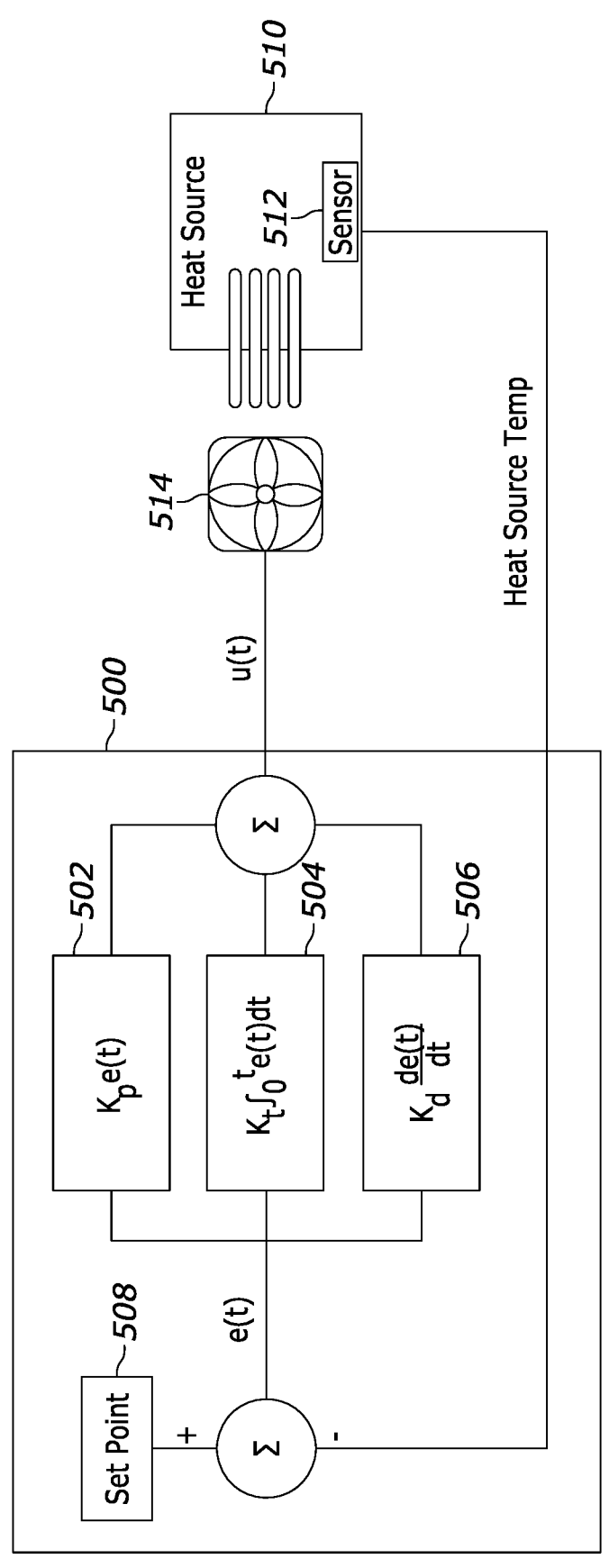
FIG. 5 shows a block diagram of an example proportional integral derivative (PID)-based fan controller and fan that may be used consistent with present principles.

FIG. 5 shows an example proportional integral derivative (PID)-based fan controller block diagram. Thus, a PID controller 500 may include first, second, and third branches 502-506 in parallel with each other and each using a function e(t), which may be the difference between a set point/target temperature 508 and an actual temperature of a heat source 510 as sensed by a sensor 512.

As shown in FIG. 5, the first branch 502 may use a first constant $K_P$, the second branch 504 may use a second constant $K_I$, and the third branch 506 may use a third constant $K_D$. The first, second, and third constants may be positive or negative numbers/control parameters determined using a machine learning-based model that learns and/or empirically determines the optimal respective constant (e.g., determined empirically using one or more closed-form methods and subsequent trial and error). The constants may also be set by a system administrator, technician, manufacturer, etc. and may be fine-tuned for efficacy and efficiency.

As also shown in FIG. 5, the first branch 502 may apply the function $K_P(e(t))$, the second branch 504 may apply the function $$K_I\left(\int_0^t e(t)dt\right),$$

and the third branch 506 may apply the function $K_D(d$ e(t)/dt). The result of the function from each branch 502-506 may then be added together to render an output u(t), which may be a fan control time function indicating a particular speed at which to drive a fan 514 to remove heat from the heat source 510.

The PID controller 500 may thus establish a closed loop in that feedback may be fed back into the system (temperature sensed by the sensor 512 in this case) to continue to change/modify the fan speed under dynamic conditions as time goes on. The dynamic conditions might include server load fluctuations due to multiple instantiations of one or more video games being loaded, executed, closed, etc. in a cloud-gaming environment, for example.

Figure 6:
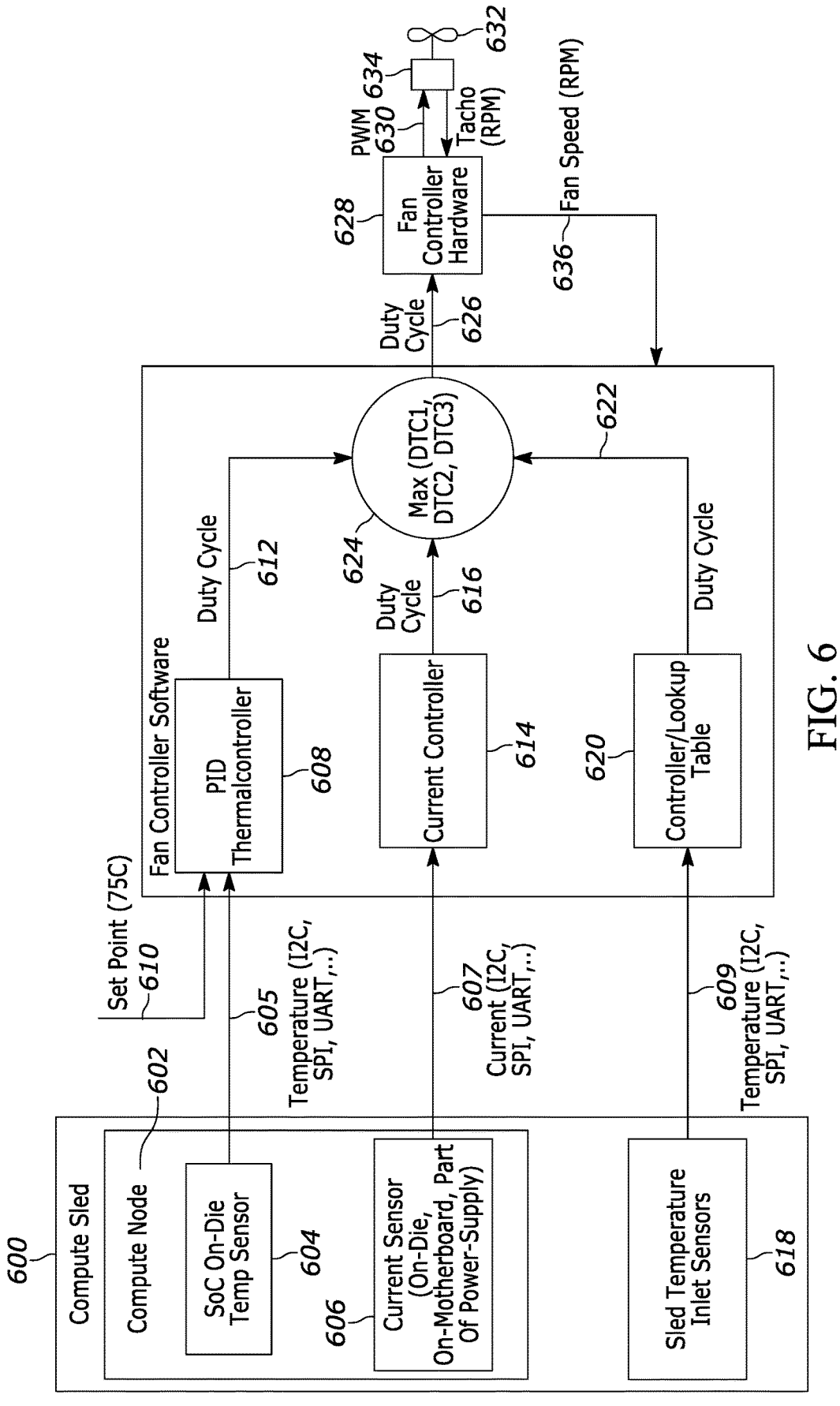
FIG. 6 shows a schematic of an example implementation of thermal cooling using both a temperature controller and current controller consistent with present principles.

Continuing the detailed description in reference to FIG. 6, a schematic is shown of an example implementation of thermal cooling using both a temperature controller and current controller. The current controller may employ a table or other algorithm consistent with present principles.

As shown in FIG. 6, a compute sled (single large expensive disk) 600 may have a compute node 602. The node 602 itself may include both a system on a chip (SoC) on-die temperature sensor 604 as well as a current sensor 606. The sensor 606 may be on-die, on-motherboard, part of the power supply, etc. As also shown in FIG. 6, the temperature sensor 604 may use I2C (inter-integrated circuit) communication, SPI (serial peripheral interface) communication, and/or UART (Universal Asynchronous Receiver/Transmitter) communication to report real-time, current temperature values 605 sensed by the sensor 604 to a PID thermal controller 608, which may function similar to the PID controller 500 described above. Note further that other types of communication may also be used, like a thermocouple connected to an integrated A→D input on the controller 608, or even Ethernet or Wi-Fi. The controller 608 may also be configured with a set point/target temperature 610 to maintain (e.g., not exceed), which is 75 Celsius in the present example. The controller 608 may, using the principles set forth above, then output a first duty cycle/fan speed 612 in closed-loop fashion (e.g., using feedback as described above) to maintain/not exceed the set point temperature 610.

As also shown in FIG. 6, the current sensor 606 may use I2C communication, SPI communication, and/or UART communication to report a real-time current value 607 (e.g., in Amps) sensed by the sensor 606 to a current controller 614. Other types of communication including those set forth above may also be used (e.g., thermocouple, Wi-Fi, etc.). The controller 614 may then output a second duty cycle/fan speed 616 in open-loop fashion. The controller 614 may output the second duty cycle 616 by taking the current value 607, accessing a mapping/lookup table that maps respective currents/current ranges to target fan speed, and entering argument to identify a duty cycle entry corresponding to a current range into which the actual sensed current falls. The table itself may be configured by a system administrator, technician, manufacturer, etc. based on desired specifications and/or empirical testing. An example illustration of such a table may be as follows:

```
"zones" : [
  { "name" : "zone1", "min" : 0.0, "max" : 5.0, "output" : 10 },
  { "name" : "zone2", "min" : 5.0, "max" : 10.0, "output" : 20 },
  { "name" : "zone3", "min" : 10.0, "max" : 20.0, "output" : 30 },
  { "name" : "zone4", "min" : 20.0, "max" : 30.0, "output" : 40 }
]
```

FIG. 6 further shows that in some examples, sled temperature inlet sensors 618 may also be used to report real-time, current temperature values 609 sensed by the sensors 618 to a temperature controller 620 that itself may have access to a lookup table. These values may relate to, for example, temperature inside the server chassis and/or in the server room more generally. Again note that I2C communication, SPI communication, and/or UART communication may be used to report the value(s) 609 to the controller 620.

Other types of communication including those set forth above may also be used (e.g., thermocouple, Wi-Fi, etc.). The controller 620 may then output a third duty cycle/fan speed 622 in open-loop fashion. The controller 620 may output the third duty cycle 622 by taking the temperature value 609, accessing a mapping/lookup table, and entering argument to identify a duty cycle entry corresponding to a temperature range into which the actual sensed temperature falls. This table may also be configured by a system administrator, technician, manufacturer, etc. based on desired specifications and/or empirical testing.

Then at decision step 624, which may be executed by any of the controllers 608, 614, or 620 (or even by a separate controller), the duty cycle of the first, second, and third duty cycles 612, 616, and 622 that correlates to the highest/fastest fan speed among the three may be selected as operative duty cycle 626. The operative duty cycle 626 is then fed into the fan controller hardware 628. The hardware 628 then takes the operative duty cycle 626 and demanded frequency for which it has been configured to output a pulse width modulation (PWM) signal 630 to drive a fan 632 via its motor 634 according to the highest/fastest fan speed that was selected (as reflected by the operative duty cycle 626). If desired, the motor 634 may also report its rotations per minute (RPM) back to the hardware 628 so the target PWM can be adequately maintained. The RPMs may also be routed back into the fan controller software itself as shown by element 636.

The example logic of FIG. 7 further illustrates. Beginning at block 700, a processor configured to undertake present principles may receive a temperature value from the sensor 604. The logic may then move to block 702 where the processor may execute a PID controller to output a first duty cycle. Thereafter, the logic may proceed to block 704 where the processor may receive a current value from the sensor 606 to, at block 706, execute a current controller to access a first mapping table and output a second duty cycle using the first mapping table. The logic may then proceed to block 708 where the processor may receive a temperature value from the one or more sensors 618 to, at block 710, execute a temperature controller to access a second mapping table and output a third duty cycle using the second mapping table.

From block 710 the logic may then proceed to block 712. At block 712 the processor may select one of the first, second, and third duty cycles that correlates to the highest/fastest fan speed from among the three to then provide the selected duty cycle to the fan controller hardware as the operative duty cycle at block 714, thus establishing an operative fan speed. The logic may then proceed to block 716 where the processor may drive one or more fans according to the operative duty cycle/corresponding PWM and, if desired at block 718, feed the RPMs back into the fan controller software. The RPMs may be fed back, for example, for the processor to proactively manage overcooling or undercooling based on the current RPMs and current temperature to further conserve power. The logic may then revert back to block 700 to proceed again therefrom.

It may now be appreciated according to FIGS. 6 and 7 that, in one example, current may be used as a proxy to drive the fan(s) faster while temperature builds within the device as opposed to using temperature alone for driving the fans since temperature can lag behind load. Then at a certain point when the temperature catches up to the load placed on the system, the controllers 608/620 may take over and drive the fan(s) according to temperature and closed-loop feedback. If the load further increases from that point, current might again be used as a proxy for driving the fans until temperature catches up. Thus, all three of the controllers 608, 614, and 620 may be executed concurrently in parallel, with current values providing a baseline for thermal management and temperature values contributing on top of that for even more-refined thermal management.

Also note before moving on that in some examples where multiple compute nodes in a sled share the same fans, one PID controller and one current controller may be used, but further note that in other examples multiple PID controllers and multiple current controllers may be used. Additionally note that in some examples more than one current sensor may provide input (e.g., there may be a current sensor for each of multiple compute nodes, with the algorithm combining those inputs to determine a max current). Still further, note that current as used in this implementation (and others discussed below) may be a current real-time/moving average of current into the system over a most-recent threshold amount of time so that, for example, the moving average of current is used as entering argument to the table above that correlates current to different fan speed/duty cycles. Low pass filters may also be used to smooth the current values. Still further, temperature as used according to the implementations discussed herein may also be a current real-time/ moving average of temperature over a most-recent threshold amount of time (same or different threshold amount of time).

Figure 8:
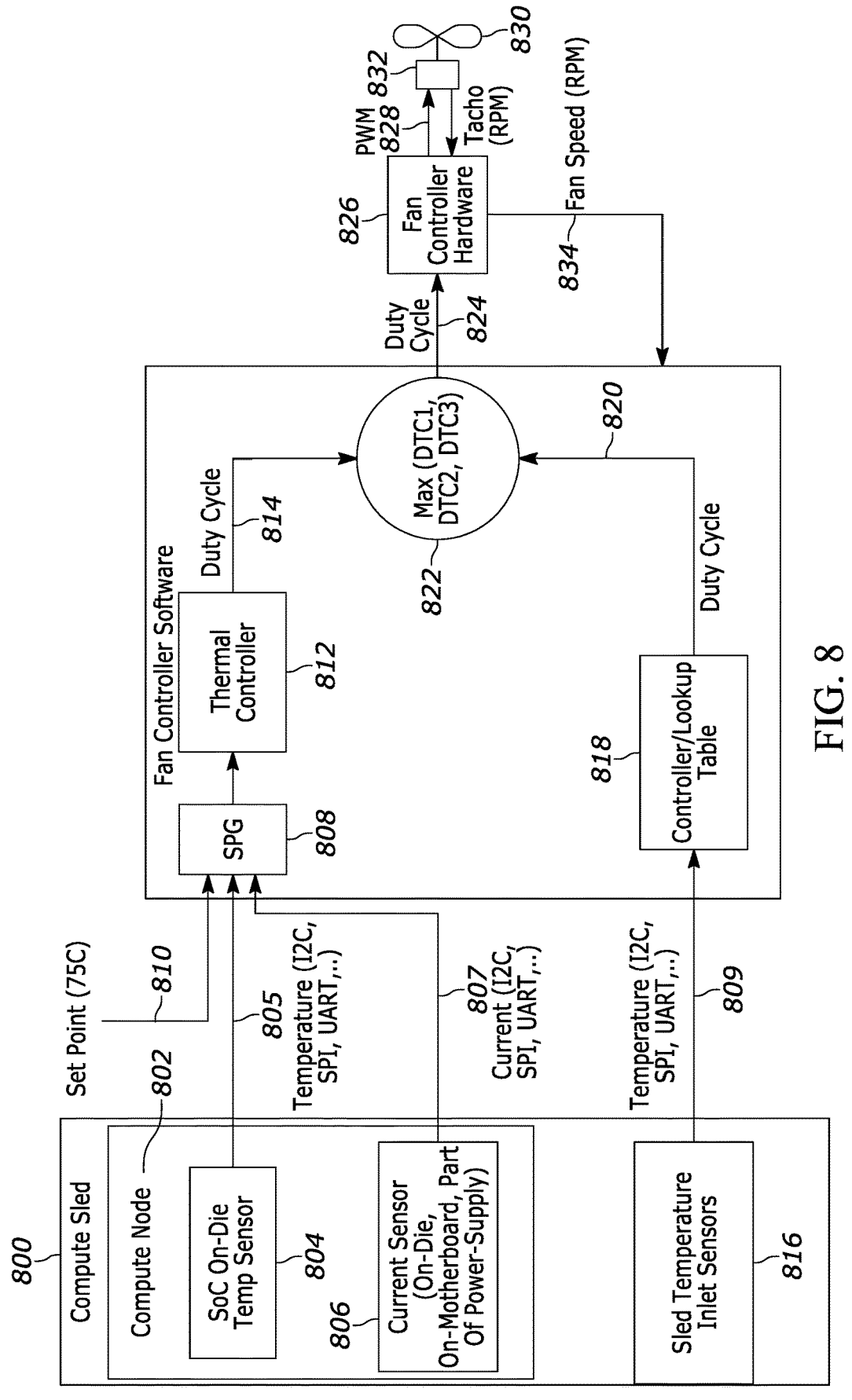
FIG. 8 shows a schematic of an example implementation of thermal cooling using a set point generator (SPG) consistent with present principles.

Now in reference to FIG. 8, another example implementation for thermal cooling is shown via another schematic. Here again a compute sled 800 may have a compute node 802. The node 802 itself may include both an SoC on-die temperature sensor 804 as well as a current sensor 806. The sensor 806 may be on-die, on-motherboard, part of the power supply, etc. As also shown in FIG. 8, the temperature sensor 804 may use I2C communication, SPI communication, and/or UART communication to report real-time, current temperature values 805 sensed by the sensor 804 to a setpoint generator (SPG) 808. Other types of communication including those set forth above may also be used (e.g., thermocouple, Wi-Fi, etc.). The SPG 808 may also be configured with a set point/target temperature 810 to maintain (e.g., not exceed), which is 75 Celsius in the present example.

As also shown in FIG. 8, the current sensor 806 may use I2C communication, SPI communication, and/or UART communication to report a real-time current value 807 sensed by the sensor 806 to the SPG 808. Other types of communication including those set forth above may also be used (e.g., thermocouple, Wi-Fi, etc.). The SPG 808 may then take the values 805 and 807 to generate a dynamic setpoint temperature according to a function/curve that may be empirically determined or configured by a system administrator, technician, manufacturer, etc. according to system specifications.

Accordingly, per the example implementation of FIG. 8, a variable temperature target/setpoint temperature may be used that varies based on various current and/or temperature values. Note further that the SPG 808 may generate a temperature target not just based on real-time current and temperature factors from the sensors 804, 806 but also based on a variety of other factors/sensor inputs, including input from power sensors, input from ambient air temperature sensors, input from server room temperature sensors, etc. But assuming current is used as a factor, the SPG 808 can be configured with different current zones/ranges for different temperature targets. For example, the SPG 808 may have access to a mapping table with different current ranges and different corresponding temperature targets for currents falling within those ranges so that a particular current value sensed by a current sensor may be entered as argument to identify a particular temperature target. The SPG 808 may then output the identified temperature target/variable setpoint to a thermal controller 812, which itself may be a PID or PID-like controller, to then output a first duty cycle 814 based on this temperature target/variable setpoint.

Thus, based on current ramp up, a dynamic lower temperature target may be used to engage the fan(s) (or other cooling elements) prior to current reaching a steady state where a fixed max set point temperature may otherwise be used, thereby saving power and possibly preventing thermal damage to hardware components since fan speed can be ramped up as current ramps up (e.g., proportionally). But further note that the max set point temperature target may also be used so that, e.g., a PID controller like the PID controllers 500/608 may also be embodied in the SPG 808 and executed so the actual temperature still does not exceed the max set point temperature. Further note that the max set point temperature may be set by a technician, system administrator, manufacturer, etc. based on whatever is the max chip temperature (e.g., according to the thermal design limit of the SoC).

Still in reference to FIG. 8, further note that sled temperature inlet sensors 816 may also be used in this implementation to report real-time, current temperature values 809 sensed by the sensors 816 to a temperature controller 818 that itself may have access to a lookup table. These values may relate to, for example, temperature inside the server chassis and/or in the server room more generally. Again note that I2C communication, SPI communication, and/or UART communication may be used to report the value 809 to the controller 818. Other types of communication including those set forth above may also be used (e.g., thermocouple, Wi-Fi, etc.). The controller 818 may then output a second duty cycle/fan speed 820 in open-loop fashion. The controller 818 may output the third duty cycle 820 by taking the temperature value 809, accessing a mapping/lookup table, and then entering argument to identify a duty cycle entry corresponding to a temperature range into which the real-time temperature falls. This table may also be configured by a system administrator, technician, manufacturer, etc. based on desired specifications and/or empirical testing.

Then, also per FIG. 8, at decision step 822, which may be executed by either of the controllers 812, 818 (or even by a separate controller), the duty cycle of the first and second duty cycles 814, 820 that correlates to the highest/fastest fan speed may be selected as operative duty cycle 824. The operative duty cycle 824 is then fed into the fan controller hardware 826. The hardware 826 then takes the operative duty cycle 824 and demanded frequency for which it has been configured to output a pulse width modulation (PWM) signal 828 to drive a fan 830 via its motor 832 according to the highest/fastest fan speed that was selected (as reflected by the operative duty cycle 824). If desired, the motor 832 may also report its rotations per minute (RPM) back to the hardware 826 so the target PWM can be adequately maintained. The RPMs may also be routed back into the fan controller software itself as shown by element 834.

The example logic of FIG. 9 further illustrates. Beginning at block 900, a processor configured to undertake present principles may receive a temperature value from the sensor 804 at the SPG 808. The logic may then move to block 902 where the processor may receive a current value from the sensor 806 at the SPG 808 to, at block 906, execute the SPG 808 to generate a dynamic setpoint temperature which the SPG 808 then provides to the thermal controller 812. The logic may then proceed to block 906 where the processor may execute the thermal controller 812 to output a first duty cycle in closed-loop fashion.

Thereafter, the logic may move to block 908 where the processor may receive a temperature value from the one or more sensors 816 to, at block 910, execute the temperature controller 818 to access a mapping table and output a second duty cycle using the mapping table. From block 910 the logic may then proceed to block 912 where the processor may select one of the first and second duty cycles that correlates to the highest/fastest fan speed from among the two to then provide the selected duty cycle to the fan controller hardware as the operative duty cycle at block 914, thus establishing an operative fan speed. The logic may then proceed to block 916 where the processor may drive one or more fans according to the operative duty cycle/corresponding PWM and, if desired at block 918, feed the RPMs back into the fan controller software. The RPMs may be fed back, for example, for the processor to proactively manage over-cooling or undercooling based on the current RPMs and current temperature to further conserve power. The logic may then revert back to block 900 to proceed again therefrom.

It may now be appreciated according to FIGS. 8 and 9 that, in one example, current may again be used as a proxy to drive the fan(s) faster while temperature builds within the device as opposed to using temperature alone for driving the fans since temperature can lag behind load. Then at a certain point when the temperature catches up to the load placed on the system, the controller 818 may take over and drive the fan(s) according to temperature. If the load further increases from that point, current might again be used as a proxy for driving the fans until temperature catches up. Thus, the SPG 808/controller 812 may be executed concurrently in parallel with the controller 818, with current values providing a baseline for thermal management and temperature values contributing on top of that for even more-refined thermal management.

Figure 10:
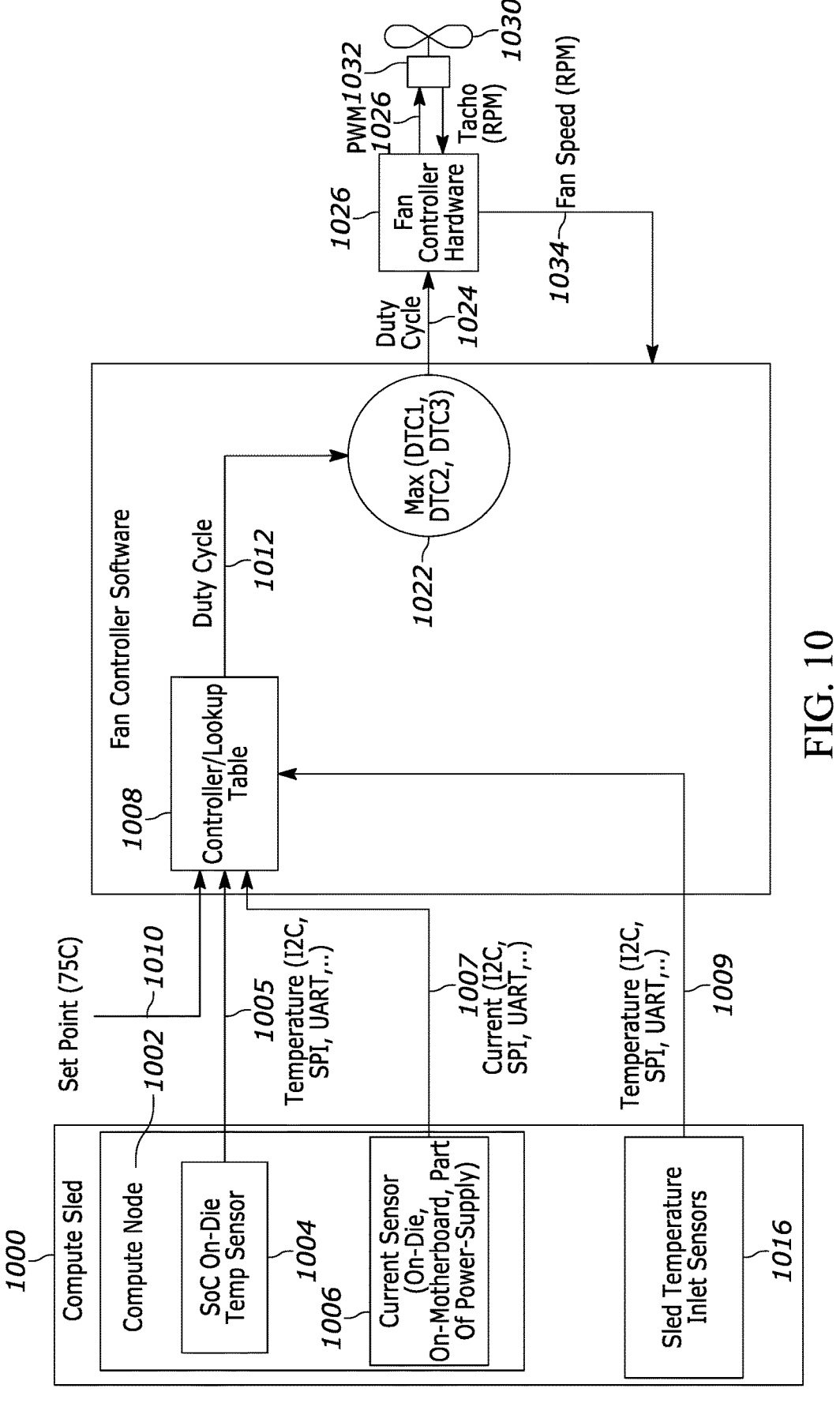
FIG. 10 shows a schematic of an example implementation of thermal cooling using an N-dimensional lookup table consistent with present principles.

Continuing the detailed description in reference to FIG. 10, another example implementation for thermal cooling is shown via yet another schematic. Here again a compute sled 1000 may have a compute node 1002. The node 1002 itself may include both an SoC on-die temperature sensor 1004 as well as a current sensor 1006. The sensor 1006 may be on-die, on-motherboard, part of the power supply, etc. As also shown in FIG. 10, the temperature sensor 1004 may use I2C communication, SPI communication, and/or UART communication to report real-time, current temperature values 1005 sensed by the sensor 1004 to a controller config-ured with access to a lookup/mapping table in storage. Other types of communication including those set forth above may also be used (e.g., thermocouple, Wi-Fi, etc.). The controller 1008 may also be configured with a set point/target tem-perature 1010 to maintain (e.g., not exceed), which is 75 Celsius in the present example.

As also shown in FIG. 10, the current sensor 1006 may use I2C communication, SPI communication, and/or UART communication to report a real-time current value 1007 sensed by the sensor 1006 to the controller 1008. Other types of communication including those set forth above may also be used (e.g., thermocouple, Wi-Fi, etc.). The controller 1008 may also receive, from sled temperature inlet sensors 1016, real-time current temperature values 1009 sensed by the sensors 1016. Again note that these values 1009 may relate to, for example, temperature inside the server chassis and/or in the server room more generally (e.g., ambient air temperature). Again note that I2C communication, SPI com-munication, UART communication, and/or other types of communication mentioned above may be used to report the values 1009 to the controller 1008.

The controller 1008 may then take the values 1005, 1007, and 1009 and access the aforementioned lookup table to which it has access to then enter argument and locate an appropriate duty cycle/target fan speed entry for the com-bination of values 1005, 1007, 1009. This lookup table may therefore be an N-dimensional table that correlates, for each entry, a duty cycle to a particular combination of values/value ranges for the different types of values 1005, 1007, 1009. The table may be manually populated based on testing and/or preference by a system administrator, technician, manufacturer, etc. The table may thus provide respective fan speeds for each combination of temperature and current values (and any other additional factors that might be considered in a given implementation, such as power). A selected duty cycle 1012 may then be output by the con-troller 1008 using the lookup table.

Then, also per FIG. 10, at decision step 1022, which may be executed by the controller 1008 (or even by a separate controller), an operative duty cycle 1024 that corresponds to the highest/fastest fan speed may be selected (e.g., if an additional duty cycle was reported by a PID controller operating in parallel with the controller 1008 similar to as described above). The operative duty cycle 1024 may then be then fed into the fan controller hardware 1026 in closed-loop fashion. The hardware 1026 then takes the operative duty cycle 1024 and demanded frequency for which it has been configured to output a pulse width modulation (PWM) signal 1028 to drive a fan 1030 via its motor 1032 according to the highest/fastest fan speed that was selected (as reflected by the operative duty cycle 1024). If desired, the motor 1032 may also report its rotations per minute (RPM) back to the hardware 1026 so the target PWM can be adequately main-tained. The RPMs may also be routed back into the fan controller software itself as shown by element 1034.

The example logic of FIG. 11 further illustrates. Begin-ning at block 1100, a processor configured to undertake present principles may receive a temperature value from the sensor 1004 at the controller 1008. The logic may then move to block 1102 where the processor may receive a current value from the sensor 1006 at the controller 1008. Then at block 1104 the processor may receive additional values, temperature and/or non-temperature, from the sensors 1016.

Afterwards, the logic may proceed to block 1106 where the processor may execute the controller 1008 to access an N-dimensional lookup table and select a duty cycle from the table that has been matched to the particular combination of values received at blocks 1100-1104. Thereafter, the logic may proceed to block 1108 where the processor may select an operative duty cycle that correlates to the highest/fastest fan speed to then provide the selected duty cycle to the fan controller hardware as the operative duty cycle at block 1110, thus establishing an operative fan speed. The logic may then proceed to block 1112 where the processor may drive one or more fans according to the operative duty cycle/corresponding PWM and, if desired at block 1114, feed the RPMs back into the fan controller software. The logic may then revert back to block 1100 to proceed again therefrom.

It may now be appreciated according to FIGS. 10 and 11 that, in one example, current may again be used as a proxy to drive the fan(s) faster while temperature builds within the device as opposed to using temperature alone for driving the fans since temperature can lag behind load. Then at a certain point when the temperature catches up to the load placed on the system, the controller 1008 may take over and drive the fan(s) according to temperature. If the load further increases from that point, current (and/or potentially other non-temperature factors like power) might again be used as a proxy for driving the fans until temperature catches up. Thus, current may provide a baseline for thermal management and temperature values may contribute on top of that for even more-refined thermal management.

Now in reference to the example logic of FIG. 12, another example implementation will be described in which the non-temperature factor of video game commands and/or other types of computer commands (e.g., any computer command placing load on the heat source, such as computing job or start of a service) from an end-user may be used to control fan speed. This implementation may be executed by itself or in combination with any of the other implementations discussed above (e.g., using current as a proxy).

Figure 12:
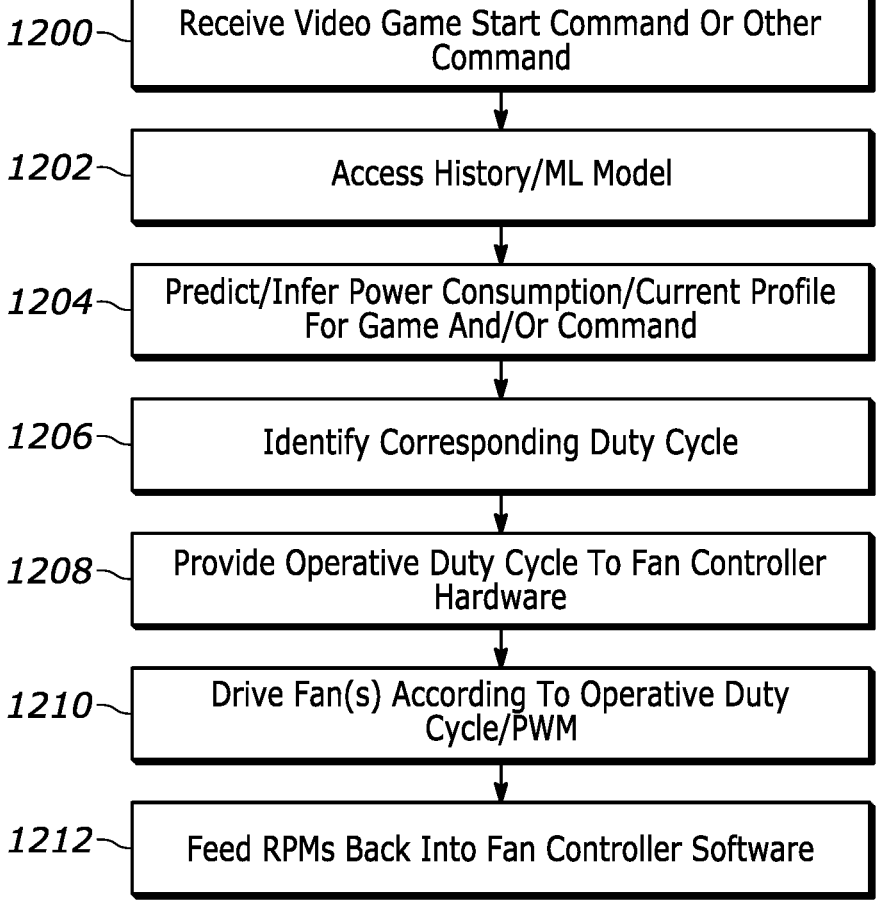
FIG. 12 shows example logic in example flow chart format that may be executed by a device to use predicted power demands for a received video game command to ramp up fan speed or other cooling element speed consistent with present principles.

But before going into greater detail on FIG. 12 itself, it is to be understood that in at least one aspect, compute note state information may be used as a non-temperature factor consistent with present principles. For example, a device operating consistent with present principles may know that a video game is starting up in a cloud gaming system, and the device may even know based on a history/tracking statistics for the video game the typical power consumption/current profile of that game. Since it can take time to actually load the game executable and game data, the corresponding user start commands and other video game-related commands may also be used, e.g., potentially as a precursor to not just temperature increases but current increases to pro-actively initiate thermal cooling consistent with present principles based on an amount of power expected to be used to begin executing the video game. Thus, these user commands may be used in addition to (e.g., in parallel) or in lieu of the other example implementations discussed above.

Now describing FIG. 12 in detail, the logic may begin at block 1200 where a processor operating consistent with present principles may receive or otherwise identify a game start command or other type of command that affects game-play/corresponding device load. The logic may then proceed to block 1202 where a current draw/power consumption history for the video game may be accessed. Additionally or alternatively, at block 1202 the processor may access an artificial intelligence (AI) model trained through machine learning techniques as set forth above.

First in terms of the aforementioned history, the history may be generated over time based on the same or similar commands from other players that have played the same video game in the past. The history may indicate respective current draws/ensuing power consumption for the respective command, and the processor may then take an average of those draws/power consumptions for the same command as received at block 1200 and average them (e.g., an average of the most-recent ten entries in the history) to identify an average current draw/power consumption which may then be used as a prediction at block 1204 for the amount of current that will be drawn or power consumed in the present instance. Thus, the command may have its own "current profile" as determined based on the history so that, at block 1206, a corresponding duty cycle/fan speed can be selected to get ahead of heat generation that will eventually ensue from execution of the game command.

Now in terms of an AI model, a recurrent or convolutional neural network may be trained with various previously-received game commands and ensuing current draws/power consumptions as inputs to infer a corresponding fan speed (labeled output). This may be done so the model can infer, at deployment, an appropriate fan speed for a given game command that is actually received from an end-user. Accordingly, the model may be used during deployment at block 1206 so that the appropriate fan speed may be inferred/identified.

Then, whether a history and/or AI model is used, from block 1206 the logic may proceed to block 1208. At block 1208 the processor may provide the selected duty cycle to the fan controller hardware as the operative duty cycle, thus establishing an operative fan speed. The logic may then proceed to block 1210 where the processor may drive one or more fans according to the operative duty cycle/corresponding PWM and, if desired at block 1212, feed the RPMs back into the fan controller software. The logic may then revert back to block 1200 to proceed again therefrom for additional/different game commands.

Thus, it may now be appreciated according to FIG. 12 that, in one example, game commands may again be used to drive the fan(s) faster while temperature builds within the device as opposed to using temperature alone for driving the fans since temperature can lag. Then at a certain point when the temperature catches up to the load placed on the system due to the game command, the fan(s) may be driven according to temperature. If another game command is then received, that additional game command might also be used for driving the fans until temperature catches up again. Thus, game commands may provide a baseline for thermal management and temperature values may contribute on top of that for even more-refined thermal management.

Moving on from FIG. 12, note more generally that although example implementations have been discussed above in relation to controlling a fan that moves air through a device housing to reduce temperature, any of those implementations may also use other cooling elements like a liquid pump in addition to or in lieu of a fan. So, for example, the duty cycles discussed above may by duty cycles for one or more pumps, where the pumps pump liquid like water or another coolant around a housing of a server, to/from a heat sink, etc. for the liquid to absorb heat from the server and ultimately transfer the heat external to the server (e.g., by blowing the liquid cooler using fans at another area of the device). Note further that pumping liquid may include pumping the liquid through dedicated pipes within the device, or even pumping liquid around in a coolant jacket system where the system is itself immersed in liquid. But in either case, it is to be understood that the operative duty cycle that is used may be for pump speed rather than fan speed.

Also note as alluded to above that in addition to or in lieu of using current as a non-temperature factor according to the implementations above, power may also be used as a non-temperature factor for any of the implementations.

Still further, note that while a fastest/highest fan speed may be selected for use as set forth above, in some examples an optimal speed (but not necessarily a fastest speed) may be used. For example, a history of past fan speeds, thermal conditions, etc. may be used to heuristically determine an optimal speed that might not necessarily be the fastest speed.

While the particular embodiments are herein shown and described in detail, it is to be understood that the subject matter which is encompassed by the present invention is limited only by the claims.

What is claimed is:

1. A method, comprising:
   establishing a first speed of a fan in a server housing based
   at least in part on a non-temperature factor having a first value, wherein the first speed is established by selecting a highest speed from respective speeds respectively output by a temperature controller and a non-temperature factor controller; and establishing a second speed of the fan based at least in part on the non-temperature factor having a second value.

2. The method of claim 1, wherein the non-temperature factor comprises current.

3. The method of claim 1, wherein the non-temperature factor comprises power.

4. The method of claim 1, wherein the non-temperature factor comprises at least one factor associated with a computer command.

5. The method of claim 1, comprising:

establishing the first speed at least in part based on temperature associated with a blade server.

6. The method of claim 5, comprising:

establishing the first speed at least in part by establishing a target temperature, the target temperature varying according to the non-temperature factor.

7. The method of claim 5, comprising:

establishing the first speed at least in part by accessing a database structure using temperature and the non-temperature factor as entering arguments.

8. An apparatus, comprising:

at least one processor configured to:

establish a first mode of operation for a cooling element of a device based at least in part on a non-temperature factor having a first value; and establish a second mode of operation for the cooling element of the device based at least in part on the non-temperature factor having a second value, wherein the non-temperature factor comprises at least one factor associated with a computer command.

9. The apparatus of claim 8, wherein the at least one processor is further configured to:

establish the first mode of operation by selecting a highest speed from respective speeds respectively output by a temperature controller and a non-temperature factor controller.

10. The apparatus of claim 8, wherein the non-temperature factor comprises an amount of power expected to be used to execute the computer command.

11. The apparatus of claim 8, wherein the first mode of operation comprises a first speed, and wherein the second mode of operation comprises a second speed.

12. The apparatus of claim 8, wherein the cooling element comprises a fan.

13. The apparatus of claim 8, wherein the cooling element comprises a liquid pump.

14. The apparatus of claim 8, wherein the device is selected from the group consistent of: a server, a personal computer, a mobile device.

15. The apparatus of claim 8, wherein the non-temperature factor comprises current.

16. The apparatus of claim 8, wherein the non-temperature factor comprises power.

17. A device, comprising:

at least one computer storage that is not a transitory signal and that comprises instructions executable by at least one processor to:

establish a first mode of operation for a cooling element based at least in part on a non-temperature factor having a first value, wherein first mode of operation is established at least in part by establishing a target temperature, the target temperature varying according to the non-temperature factor; and establish a second mode of operation for the cooling element based at least in part on the non-temperature factor having a second value.

18. The device of claim 17, wherein the first mode of operation comprises a first speed, and wherein the second mode of operation comprises a second speed.

19. The device of claim 18, wherein the cooling element comprises a fan, and wherein the first and second speeds are fan speeds.

20. The device of claim 18 wherein the cooling element comprises a liquid pump, and wherein the first and second speeds are pump speeds.

* * * * *